US007003562B2

(12) United States Patent
Mayer

(10) Patent No.: US 7,003,562 B2
(45) Date of Patent: Feb. 21, 2006

(54) METHOD AND APPARATUS FOR NETWORK WIDE POLICY-BASED ANALYSIS OF CONFIGURATIONS OF DEVICES

(75) Inventor: Alain Jules Mayer, San Francisco, CA (US)

(73) Assignee: Redseal Systems, Inc., Menlo Park, CA (US)

( * ) Notice: Subject to any disclaimer, the term of this patent is extended or adjusted under 35 U.S.C. 154(b) by 759 days.

(21) Appl. No.: 09/954,327

(22) Filed: Sep. 17, 2001

(65) Prior Publication Data

US 2002/0178246 A1 Nov. 28, 2002

Related U.S. Application Data

(60) Provisional application No. 60/279,190, filed on Mar. 27, 2001.

(51) Int. Cl.
*G06F 15/173* (2006.01)
*G06F 13/10* (2006.01)
*G06F 13/12* (2006.01)
*G06F 9/44* (2006.01)

(52) U.S. Cl. ........................................ 709/223; 703/21
(58) Field of Classification Search ................ 709/203, 709/220–224; 703/13, 21
See application file for complete search history.

(56) References Cited

U.S. PATENT DOCUMENTS

| 5,440,719 | A  | * | 8/1995  | Hanes et al. ................... 703/21 |
| 6,377,987 | B1 | * | 4/2002  | Kracht ........................ 709/220 |
| 6,393,386 | B1 | * | 5/2002  | Zager et al. .................. 703/25 |
| 6,430,526 | B1 | * | 8/2002  | Toll ............................. 703/1 |
| 6,484,261 | B1 | * | 11/2002 | Wiegel ....................... 713/201 |
| 6,820,042 | B1 | * | 11/2004 | Cohen et al. .................. 703/2 |
| 2002/0021675 | A1 | * | 2/2002 | Feldmann ................... 370/254 |
| 2002/0093527 | A1 | * | 7/2002 | Sherlock et al. ............ 345/736 |
| 2003/0120955 | A1 | * | 6/2003 | Bartal et al. ................ 713/201 |

OTHER PUBLICATIONS

Feldmann et al., IP Network Configuration for Traffic Engineering, May 2000.*
Tawil et al.; Evaluation and Testing of Internet Firewalls; 1999.*
Chang et al. Network Simulations with OPNET; 1999, Proceedings of the 1999 Winter Simulation Conference.*
Dinesh C. Verma, "Policy-Based Networking, Architecture and Algorithms", pp. 5-25 (New Riders Publishing, Indianapolis, IN, Nov. 2000).
Scott M. Ballew, "Managing IP Networks with Cisco Routers", pp. 133-168 (O'Reilly & Associates, Inc., Oct. 1997).

(Continued)

*Primary Examiner*—Krisna Lim
*Assistant Examiner*—Sean Reilly
(74) *Attorney, Agent, or Firm*—Townsend and Townsend and Crew LLP

(57) ABSTRACT

A method and an apparatus for analyzing a network configuration against a corporate network policy and determining violation(s) against the corporate network policy. A report indicating the violation(s) can be generated indicating instances of the violation(s). An analysis platform reads in a network policy. The analysis platform collects configuration files from the relevant network devices in the network and builds up an internal instance of a network configuration model based on the configuration files and the network topology. The analysis platform analyzes this network configuration model according to the network policy and adds an entry to its final report each time that it detects a violation against the network policy in the network configuration model. The data in the entries pinpoints the cause of the deviation(s) from the network policy.

62 Claims, 10 Drawing Sheets

OTHER PUBLICATIONS

Craig Hunt, "TCP/IP Network Administration", pp. 164-201 (O'Reilly & Associates, Inc., Jan. 1998).

Michael Wynston, "Cisco Enterprise Management Solutions, vol. 1", pp. 143-183 (Cisco Press, Indianapolis, IN, 2001).

Kathryn M. Walker et al., "Computer Security Policies and SunScreen Firewalls", pp. 1-17 (Sun Microsystems, Inc., Palo Alto, CA, 1998).

Linda McCarthy, "Intranet Security, stories from the trenches", pp. xxiii-xxv (Sun Microsystems, Inc., Mountain View, CA, 1998).

Martin Freiss, "Protecting Networks with SATAN", pp. 87-105 (O'Reilly/International Thomson Verlag GmbH & Co. KG., Sebastopol, CA, First English Edition, May 1998).

Winston Bumpus et al., "Common Information Model, Implementing the Object Model for Enterprise Management", pp. 1-20 (John Wiley & Sons, Inc., 2000).

Alain Mayer et al., "Fang: A Firewall Analysis Engine", pp. 1-11 (21st IEEE Symposium on Security & Privacy, Oakland, CA, May 2000).

"Open Security Extension", pp. 1-2 (Check Point Software Technologies Ltd., 1999).

"The Next Big Internet Hurdle: Configuration Management", pp. 1-10 (Gold Wire Technology, Dec. 2000).

"Visual Policy Editor", 2 pages, (website: http://www.checkpoint.com/products/vpe.html, May 21, 2001).

James Allen Hoagland, "Specifying and Implementing Security Policies using LaSCO, the Language for Security Constraints on Objects" (Ph.D., Dissertation), pp. 1-130 (website: http://seclab.cs.ucdavis.edu/intel/lasco/, Mar., 2000).

Jim Geier, "Overview of Common Routing Protocols", pp. 1-8 (Wireless-Nets, Ltd., website: http://www.wireless-nets.cin/whiteparper_routing.htm, Apr. 1998).

"Routing Information Protocol (RIP)", pp. 44-1 to 44-4 (Internetworking Technology Overview, Jun. 1999).

Rutrell Yasin, "Policy Management Hits the Web", pp. 1-3 (website: http://www.pentasafe.com/new/internetweek.htm, Jan. 8, 2001).

Greg Shipley, "Cisco IOS: It's Not Just for Running Anymore", pp. 1-4 (website: http://www.networkcomputing.com/shared/printArticle?article.../1011ws1full.html&pub=nw, May 31, 1999).

C. Alaettinoglu et al., "Routing Policy Specification Language (RPSL)", pp. 1-62 (The Internet Society, website: http://www.ietf.org/rfc/rfc2622.txt, Jun. 1999).

Yair Bartal et al., "Firmato: A Novel Firewall Management Toolkit", pp. 1-15 (20th IEEE Symposium on Security & Privacy, Oakland, CA, May 1999).

Hugh Mahon et al., "Requirements for a Policy Management Systems", pp. 1-19 (The Internet Society, website: http://www.ietf.org/internet-drafts-ietf-policy-req-02.txt, Nov. 9, 2000).

* cited by examiner

METHOD AND APPARATUS FOR NETWORK WIDE POLICY-BASED ANALYSIS OF CONFIGURATIONS OF DEVICES

RELATED APPLICATIONS

This application is related to and claims the benefit of provisional application Ser. No. 60/279,190, filed Mar. 27, 2001, the contents of which are hereby incorporated by reference.

FIELD OF THE INVENTION

The present invention relates generally to Internet Protocol (IP) network devices, such as firewalls, routers, switches, servers, and more particularly, to a method and apparatus for policy-based analysis of the configurations of the network devices.

BACKGROUND OF THE INVENTION

A computer network's basic functionality is determined by the configuration of the network devices present in the network. Network devices include routers, network switches, servers, firewalls, and virtual private networks.

A router is a network gateway that joins two or more IP networks and switches packets between the networks. A network administrator can implement a high-level corporate routing policy by configuring the settings of each router in the network, including setting static routes, one or more dynamic routing protocols, suppressing dynamic routing updates on a per-interface basis, and setting routing preferences.

A network switch is a multi-port network bridge, which is generally capable of supporting multiple media types. A network bridge forwards datagrams (packets) according to media type and address (e.g., Ethernet). A network administrator can configure a network switch in much the same way as configuring a router.

A server is a host (computer) that offers one or more services used by all the other networked computers to simplify the operations of the network, such as DNS (domain name service), mail (electronic mail), and web services. A network administrator can configure the software for the particular service and can also configure the host itself (e.g., access control to the computer via TCP wrapper configuration).

A firewall is a network gateway that filters packets and separates a proprietary corporate network, such as an intranet, from a public network, such as the Internet. Most of today's firewalls are configured by means of a rule-base. A network administrator can implement a high-level corporate security policy by creating a low-level rule-base for each firewall interface in the corporate network.

A virtual private network (VPN) is a network device that secures the privacy of corporate data outside the perimeter of the corporate network. A network administrator can configure VPN devices so that corporate data sent over the public Internet (e.g., from the corporate headquarters to a remote company site) is adequately secured. This typically involves configuring settings for cryptographic key exchanges, choosing the appropriate encryption for sending data (e.g., IP packets) according to the destination, etc.

A network topology is a formal description (including IP-addresses, device description, etc.) of the network devices interconnecting the sub-networks and hosts in the network.

A network policy is a formal description of the intended capabilities and properties of the network hosts in the network.

A configuration file contains configuration data for a single network device, such as a router, firewall, or server.

A network configuration model is a data model for representing a global configuration of the network, which uses the configuration files as building blocks. A network configuration store is a device for storage of network configuration models.

A network administrator, or a group of administrators in a larger enterprise, is typically responsible for configuring all the network devices in a network, in such a way that the network devices can cooperatively enforce a corporate network policy. Any error in the configuration file of a single network device can invalidate the enforcement of the network policy. Furthermore, errors in the configuration files can go undetected for a long time. For example, a router configuration error can cause IP traffic from the Internet, which is destined for a number of hosts (computers) within the corporate network (enterprise), to be lost. Traditional network management software will not generate any alerts. Since all the routers are up and running, the routers will not generate an event to which the management software would react.

As apparent from the above-described deficiencies associated with the manual configuration of network devices, a need exists for a method and apparatus for analyzing a configuration file of each network device in a corporate (enterprise) network, matching the results against a corporate network policy, and generating reports for network administrators indicating any violations in the collective network configuration against the corporate network policy.

SUMMARY OF THE INVENTION

One aspect of the present invention is directed to a method and an apparatus for analyzing a network configuration against a corporate network policy and determining violation(s) against the corporate network policy. A report indicating the violation(s) can be generated indicating instances of the violation(s). An analysis platform (e.g., an Ontura server) reads in a network policy. A Policy Modeling Language (PML), for example, can be used to define an instance of the network policy. The analysis platform collects configuration files from the relevant network devices and builds up an internal instance of a network configuration model based on the configuration files and the network topology. The analysis platform analyzes this network configuration model according to the network policy and adds an entry to its final report each time that it detects a violation against the network policy in the network configuration model. The data in the entries pinpoints the cause of the deviation(s) from the network policy.

According to another aspect of the present invention, the network policy describes capabilities for particular hosts in the network, such as "mail server," "DNS server," etc. The analysis platform receives the network policy as an input and then analyzes the network configuration model to verify that the IP traffic from and to these hosts are limited according to the type of service, and to ensure that the right type of IP traffic get from/to a host, which includes the configuration of relevant routers for switching traffic, firewalls for passing through or dropping traffic, and local access control mechanisms on the host (e.g., TCP wrappers) for making the services accessible. Thus, the network administrator (and his/her management, e.g., Chief Information Officer (CIO)) can determine that relevant IP traffic, and only relevant IP traffic, is able to reach the hosts.

According to yet another aspect of the present invention, the network policy describes routes (e.g., sequences of IP addresses of gateways and routers) that the IP traffic should take between different sites of the same enterprise. The analysis platform receives the network policy as an input and then analyzes the configuration of the relevant routers and network switches to verify that the routes taken by the IP traffic within the enterprise, among the different corporate sites, adhere to the network policy.

BRIEF DESCRIPTION OF THE DRAWINGS

A more complete understanding of the present invention and its advantages will be readily apparent from the following Detailed Description of the Preferred Embodiments taken in conjunction with the accompanying drawings. Throughout the accompanying drawings, like parts are designated by like reference numbers and in which.

DETAILED DESCRIPTION OF THE PREFERRED EMBODIMENTS

Figure 1:
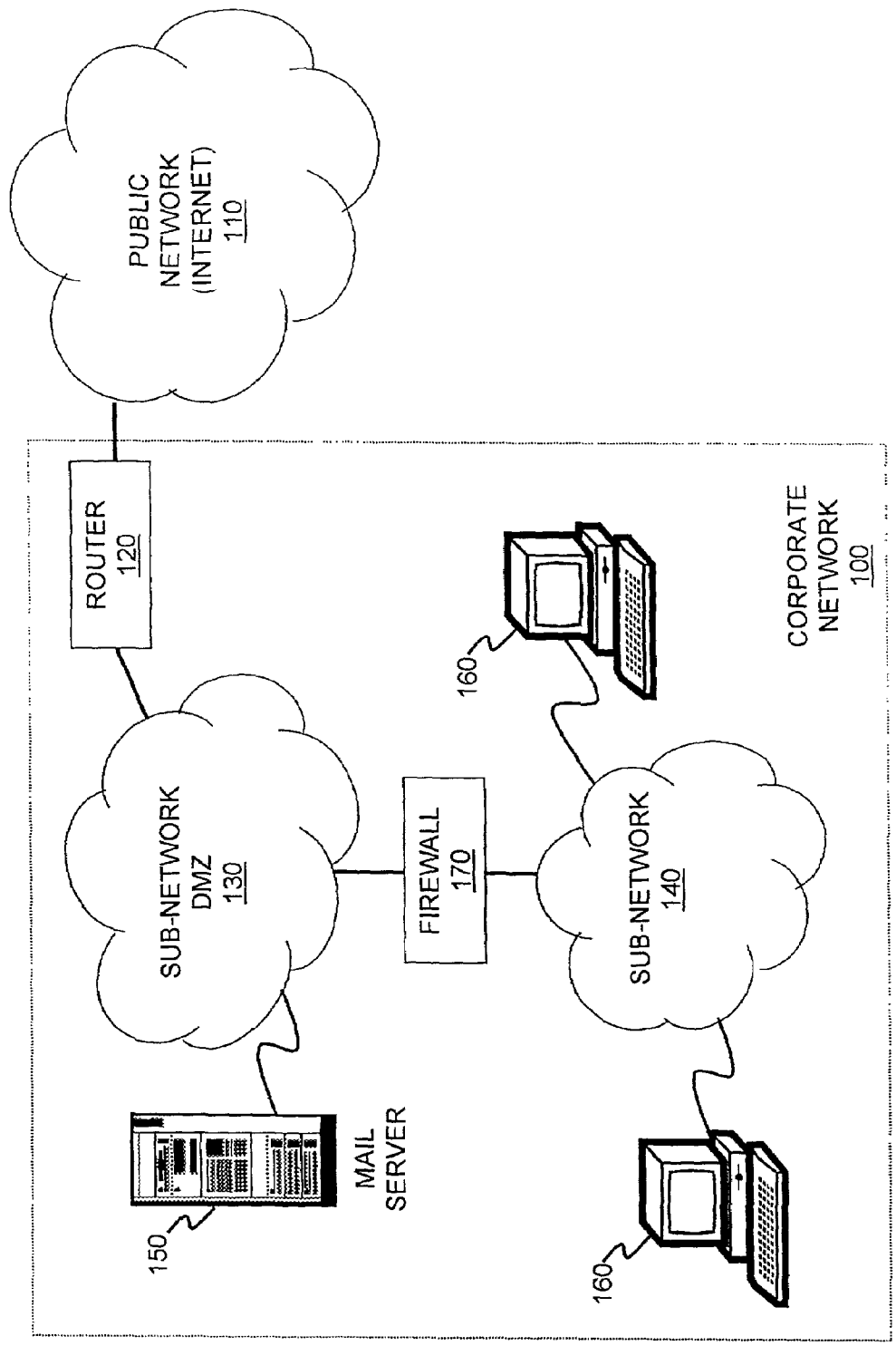
FIG. 1 is a schematic illustration of a computer network in accordance with the present invention.

FIG. 1 schematically illustrates a hardware environment of an embodiment of the present invention. A corporate network 100 is connected to a public network 110 (e.g., the Internet) via a router 120. The corporate network 100 contains a plurality of sub-networks, including a sub-network dmz 130 and a second sub-network 140. The sub-network dmz 130 is connected to the router 120 and contains a host 150 (e.g., a hardened mail server) for providing one or more services to the corporate network 100. The second sub-network 140 contains a plurality of networked computers 160. A firewall 170 filters packets between the second sub-network 140 and the public network 110 to provide security for the networked computers 160 in the corporate network 100.

Figure 2:
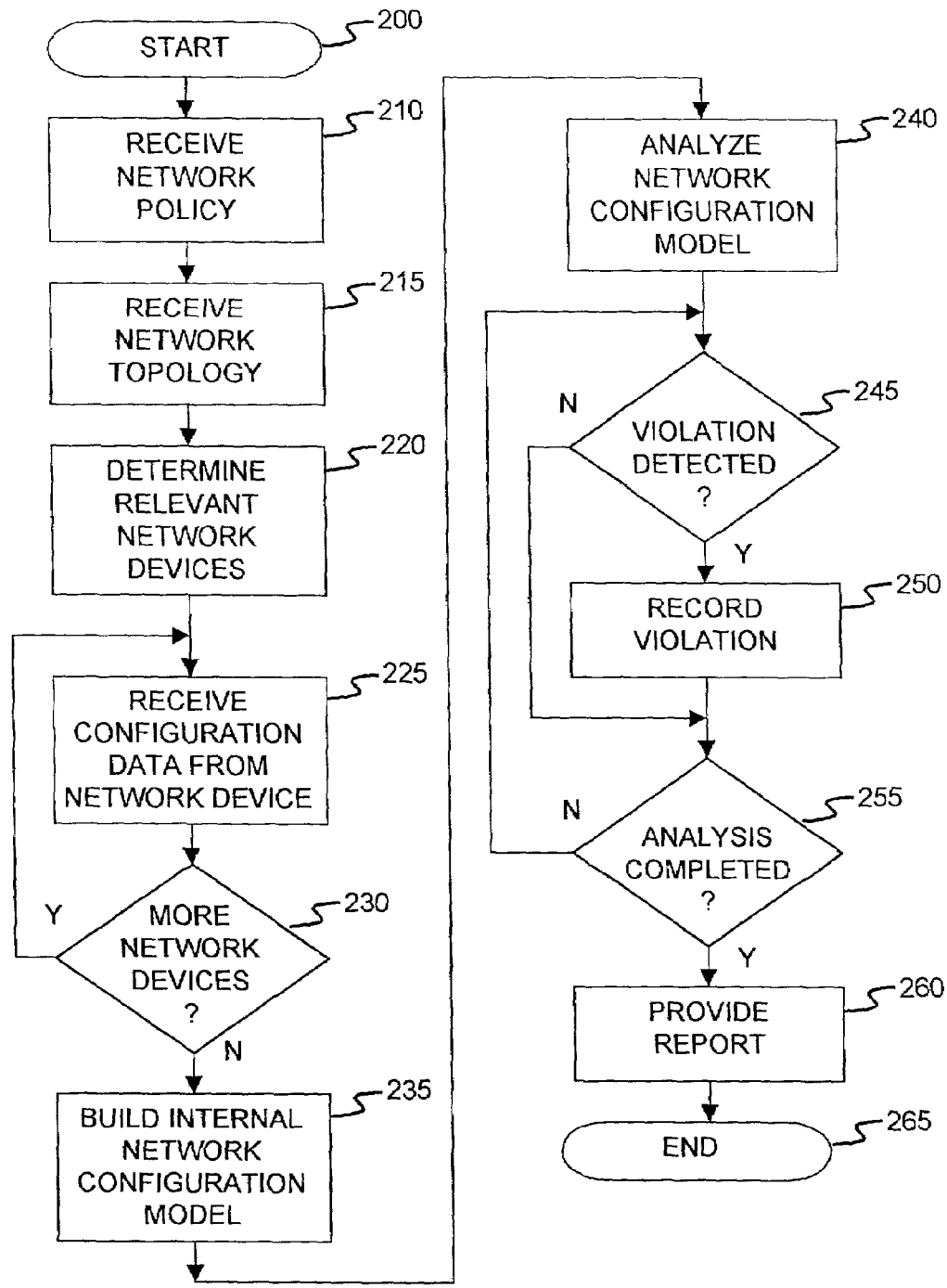
FIG. 2 is a flow diagram illustrating a method for determining violation(s) of a network policy in accordance with the present invention.

FIG. 2 is a flow diagram illustrating the operation of an analysis platform (e.g., an Ontura server) in accordance with the present invention. The process starts at step 200. In step 210, the analysis platform receives a network policy, which may be defined by a network administrator. The network policy may, for example, be stored in a network policy store on the analysis platform.

Then, in step 215, the analysis platform receives information regarding a topology of the network devices (e.g., router 120, server 150, firewall 170) in the corporate network 100. In step 220, the analysis platform determines which of the network devices in the corporate network 100 are relevant to the network policy. The determination of relevancy is based on the network topology and/or the network policy. Then, in step 225, the analysis platform receives configuration data from one of the relevant network devices. The configuration data for a particular network device may be determined by reading the configuration file of the network device.

Then, in a decisional step 230, the analysis platform determines whether there are other relevant network devices remaining. If so (Yes in step 230), the process repeats step 225 and the analysis platform receives configuration data from another of the relevant network devices. Otherwise (No in step 230), the process continues to step 235, wherein the analysis platform builds an internal network configuration model.

Then, in step 240, the analysis platform analyzes the network configuration model against the network policy to determine whether the network configuration model violates the network policy (i.e., whether a violation exists). In step 245, the analysis platform determines whether a violation of the network policy has been detected. If so (Yes in step 245), the violation is recorded in step 250 and the process continues to step 255. Otherwise (No in step 245), the process continues to step 255.

In step 255, the analysis platform determines whether the analysis has been completed. If not (No in step 255), the process returns to step 245 and continues to detect for violations of the network policy. If the analysis is complete (Yes in step 255), the process continues to step 260 wherein the analysis platform provides a report indicating the violation(s), if any, of the network policy. The report includes specific instance(s) where a device configuration causes a violation in the network policy. The process then ends in step 265.

Figure 3:
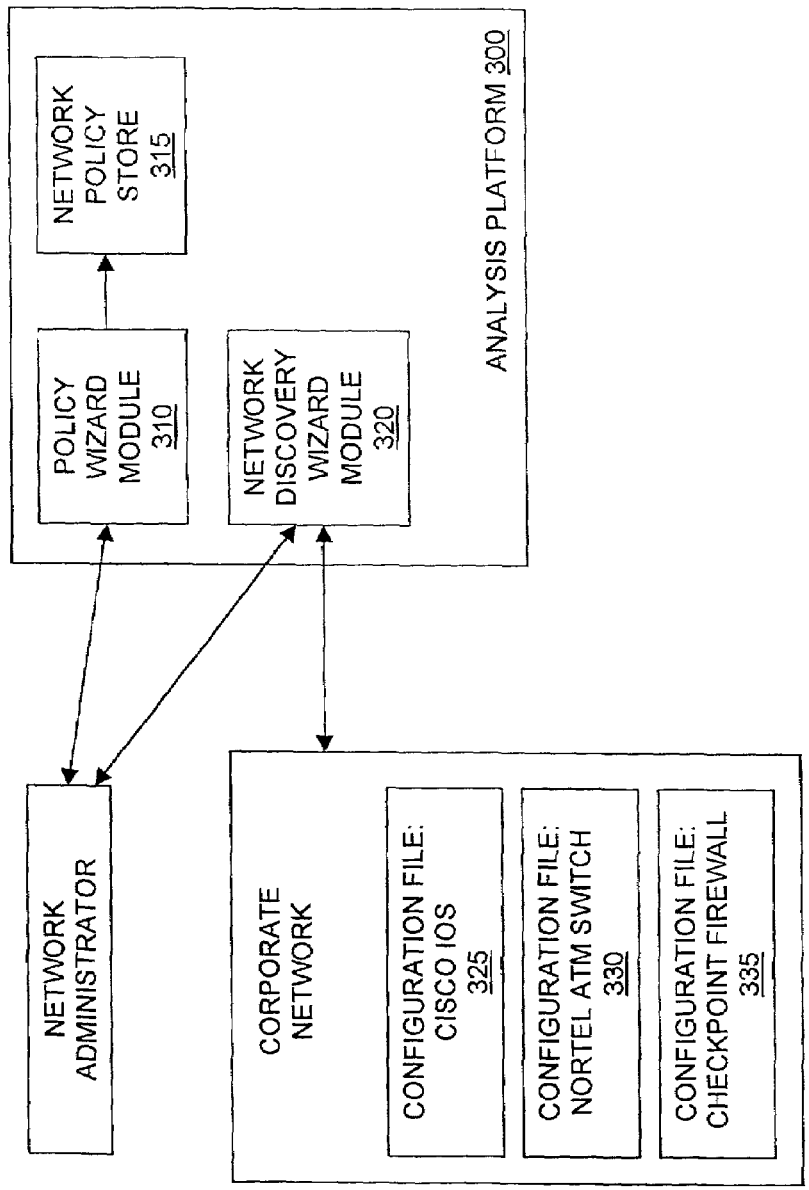
FIG. 3 is a block diagram illustrating a portion of the operating modules of an analysis platform in accordance with the present invention.

FIG. 3 is a block diagram illustrating a portion of the operating modules of an embodiment of an analysis platform (e.g., an Ontura server) 300. The analysis platform 300 includes a Policy Wizard Module 310 for assisting a network administrator with the creation of a network policy for the corporate network. Once the network policy has been created, it can then be stored in a network policy store 315 in the analysis platform 300.

The analysis platform 300 further includes a Network Discovery Wizard Module 320 for collecting data regarding the basic network connectivity (e.g., the network topology). The Network Discovery Wizard Module 320 can guide the network administrator through the process of defining the locations of the configuration files of the network devices in the corporate network that are to be analyzed by the analysis platform 300. The configuration files are typically basic text (ASCII) files such as, a configuration file 325 for a Cisco router using IOS (Internet Operating System) commands, a configuration file 330 for a Nortel switch, and a configuration file 335 for a Checkpoint firewall. Once the locations of the configuration files have been defined, the analysis platform 300 can retrieve the configuration files from the relevant network devices as required.

Figure 4:
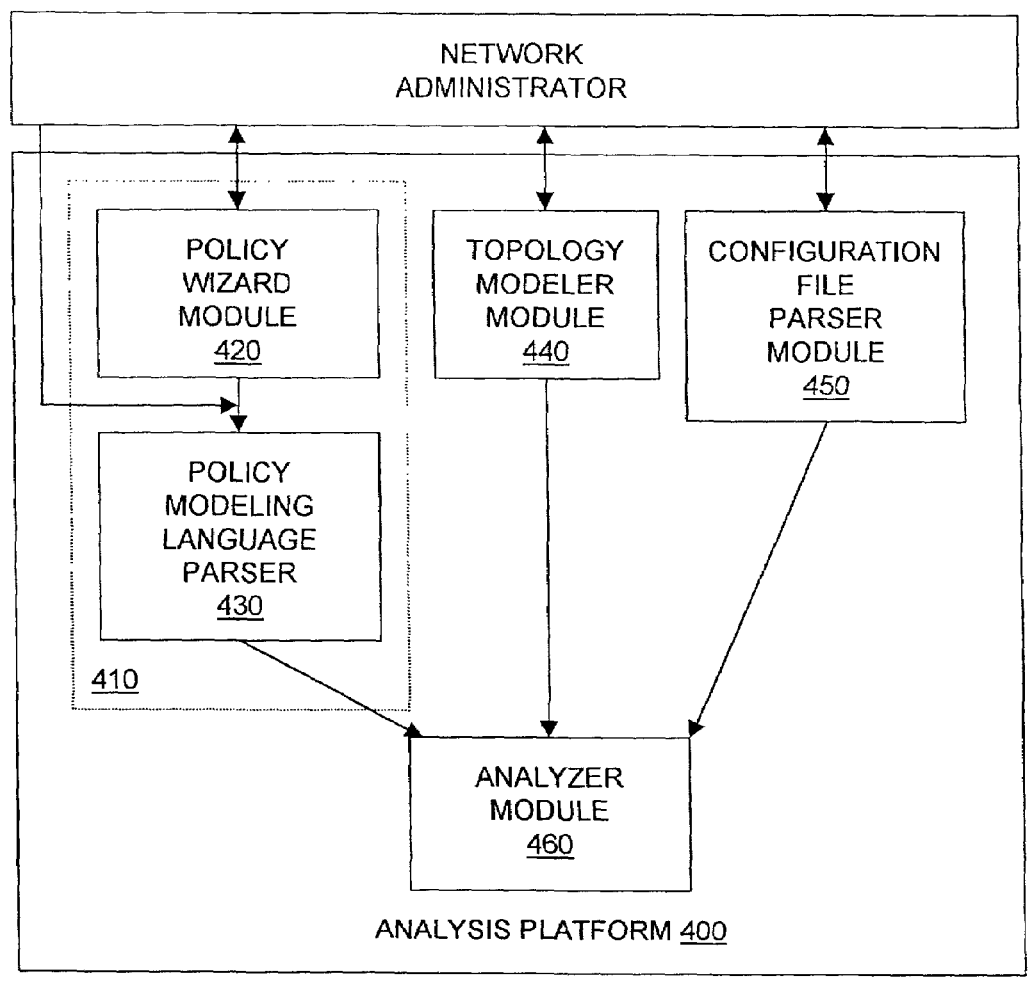
FIG. 4 is a block diagram illustrating a module structure of an analysis platform in accordance with the present invention.

FIG. 4 is a block diagram illustrating a top-level module structure of an embodiment of an analysis platform (e.g., an Ontura server) 400. The analysis platform 400 includes a Policy Modeler Module 410 having a Policy Wizard Module 420 and a Policy Modeling Language Parser 430. The Policy Wizard Module 420 is capable of assisting a network administrator in generating an instance of a Network Policy, which can be expressed as a PML program. The network administrator can also directly write a PML program that defines the network policy for input to the analysis platform 400. The Policy Modeling Language Parser 430 then transforms the PML program into an internal data model.

The Policy Modeling Language is a simple descriptive language, which can capture the intended capabilities of the network hosts. These capabilities define, among other things, the allowed access to a host, the allowed traffic interactions among the hosts, and the required security protection on each of the hosts.

The analysis platform 400 further includes a Topology Modeler Module 440. The Topology Modeler Module 440 can execute a network discovery phase (e.g., by employing the Network Discovery Wizard Module 320) for discovering the topology of the corporate network, including the locations of the network devices and the interconnections between the network devices. Once the network discovery phase has been performed, the Topology Modeler Module 440 can transform the newly acquired knowledge of the network topology into an internal data model. The Topology Modeler Module 440 can also prompt the network administrator for the location(s) and/or the access authorization information (e.g., passwords) of the respective configuration file(s) of the newly discovered network devices.

The analysis platform 400 also includes a Configuration File Parser Module 450 for reading the configuration files of the relevant network devices. The Configuration File Parser Module 450 is capable of understanding the syntax and semantics of the different configuration files that may be found in the relevant network devices. The Configuration File Parser Module 450 then transforms the contents of each of the configuration files and forms an internal data model, which is independent of the make of the particular network device. For example, there is an internal data model for the configuration of a router, another internal data model for a firewall, VPN, etc.

After the Policy Modeler Module 410, the Topology Modeler Module 440, and the Configuration File Parser Module 450 have processed all the required information, the internal data models contain both the Network Policy and the actual Network Configuration Model (including the network topology). An Analyzer Module 460 of the analysis platform 400 can now start its work. For each defined capability of each host (in the Network Policy), the Analyzer Module 460 generates one or more queries regarding the Network Configuration Model. Answers to the queries can either confirm or deny that the defined capability has been correctly realized. For example, with respect to a network host having the capability of a DNS server, queries regarding the type of traffic that can reach the server, the type of traffic that can leave the server, and what security and performance settings are on the server may be part of the set of queries. The Analyzer Module 460 then executes the collected set(s) of queries. This involves executing various algorithms on the data structures representing the Network Configuration Model. Finally, the Analyzer Module 460 collects the answers to the queries and issues a report with appropriate entries for each detected violation.

Figure 5:
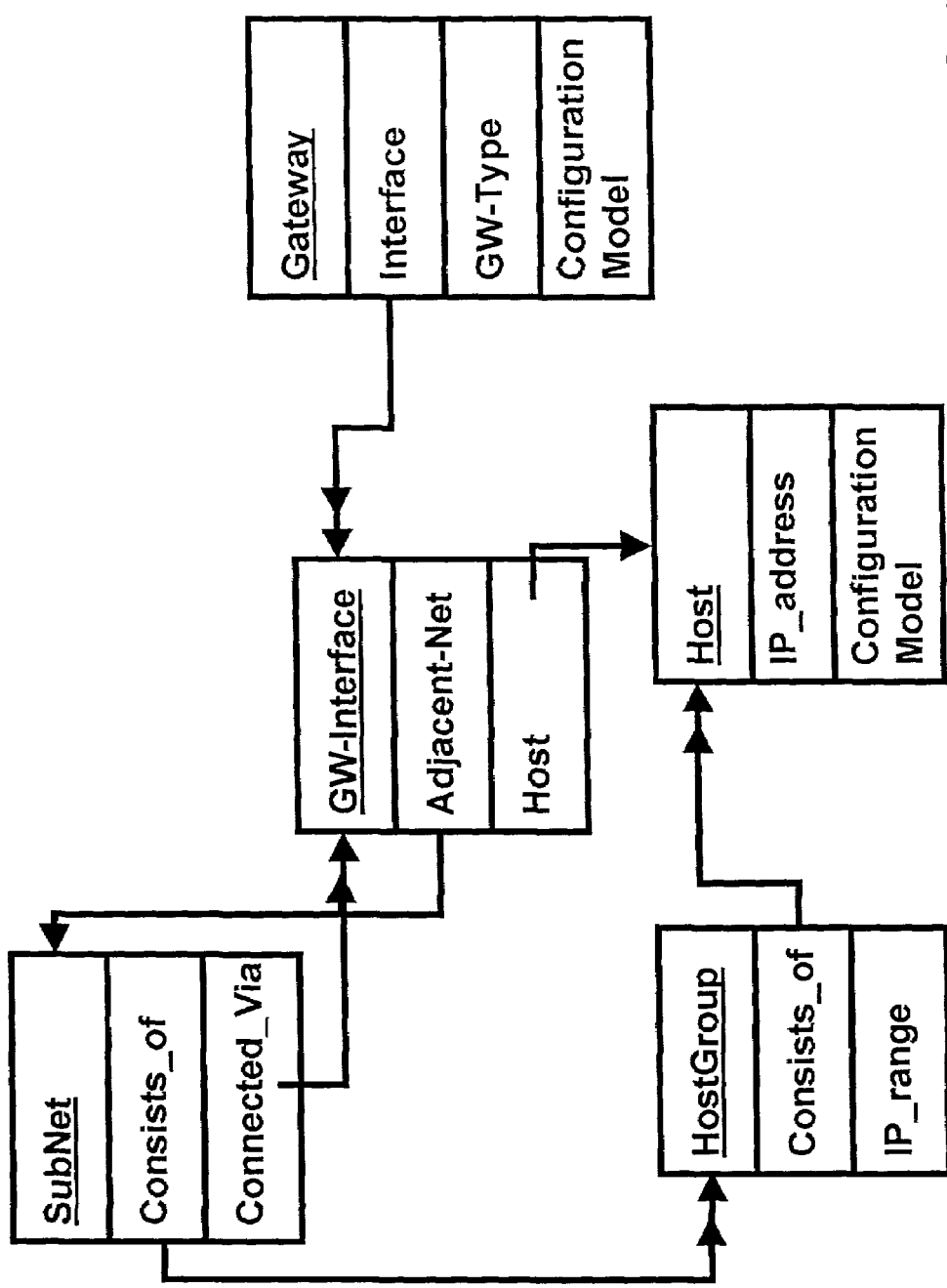
FIG. 5 is an entity-relationship model representing a network topology in accordance with the present invention.

FIG. 5 illustrates a portion of an embodiment of an Entity-Relationship (ER) model representing a network topology. In the illustration, a single arrow denotes a one-to-one relationship while a double arrow denotes a one-to-many relationship. An analysis platform (e.g., an Ontura server) uses the ER model to capture and model the topology of the corporate network. The relevant data concerns subnetworks (SubNet) of the network under consideration, and the gateway interfaces (GW-Interface) connecting the SubNet. Each SubNet consists of a plurality of HostGroups. Each HostGroup consists of a plurality of Hosts and has a range of IP addresses (IP_range). Each Host has an IP address (IP_address). The Gateways switch packets between the SubNets and can typically include routers, firewalls, or network switches (e.g., an ATM switch). The ER model also includes pointers to the configuration models of the gateways and the relevant hosts (servers). The ER model includes a vendor-independent configuration model for each type of Gateway (firewall, router, switch), which allows the Analyzer Module 460 to simulate the actions of the gateway when it receives a given type of IP traffic.

Figure 6:
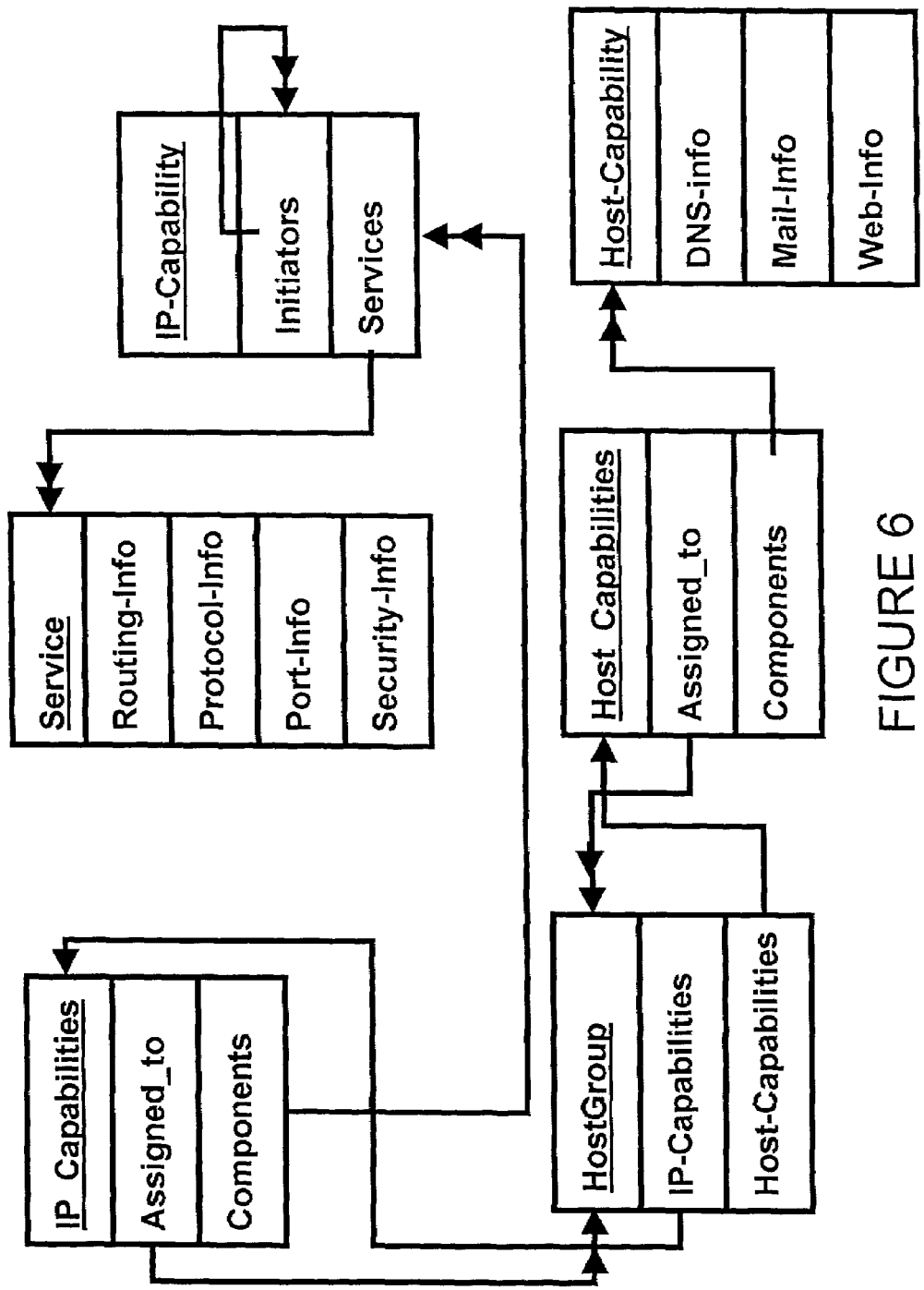
FIG. 6 is an entity-relationship model representing a network policy in accordance with the present invention.

FIG. 6 illustrates a portion of an embodiment of an Entity-Relationship (ER) model representing a Network Policy. In the illustration, a single arrow denotes a one-to-one relationship while a double arrow denotes a one-to-many relationship.

A group of hosts (HostGroup) can have capabilities associated therewith. In the illustrated embodiment, the ER model distinguishes two kinds of capabilities: IP-Capabilities and Host-Capabilities. An IP-Capability describes IP-based traffic, possibly including its source (defined as another capability), security (encryption) requirements, routing requirements, protocol requirements and more. Hosts associated with such IP-Capability are allowed to be the recipient of the described IP-based traffic. Of course, the description of routing and security properties will require further modeling. Optional features include integration with emerging standards for routing and encryption policies, such as the Routing Policy Specification Language (RPSL, a proposed standard for a Routing Policy Format), and encryption policies currently under study by the Internet Engineering Task Force (IETF) Security Policy Working Group.

A Host-Capability models a host's functionality and configuration (e.g., as a server for DNS, Mail, Web or other server functionalities). The ER model provides a specific configuration model for each of the functionalities. The capabilities can be defined and written in the Policy Modeling Language (PML) in the form of a PML program.

The ER models form a data repository, which enables the Analyzer Module 460 to verify that the capabilities defined in the policy are indeed realized in the network configuration, and, equally important, that no other capabilities are allowed. The analysis performed by the Analyzer Module 460 includes simulation of relevant network devices and the nature of the interconnections between the network devices to determine how certain IP-based traffic flows through the network under consideration. The analysis also includes simulation of the servers' actual configurations by responding to TCP-based incoming client requests (e.g., DNS, mail).

The analysis platform of the present invention uses a scripting language, such as the Policy Modeling Language (PML), to enable the network administrator to expressly define the capabilities of each of the network devices in the PML program. As part of the analysis process, the PML program is translated into the ER model. The capabilities can then be used in the ER models.

A capability, such as the Host-Capability, can be predefined. In this case, the PML parser recognizes the name of the capability. For example, the PML parser understands that the capability "dns_server" refers to a host being able to receive and send name-server related traffic from just about any source.

A capability can also be custom-defined in PML by defining the corresponding services and host groups. For example, consider the capabilities of a "hardened mail server" and "vulnerable mail server". The "hardened mail server" is typically a host that is easily accessible to a public network (e.g., the Internet). The "vulnerable mail server" is typically a host on a trusted network for delivering mail, for example, to the employees of a corporation. The network administrator defines the "hardened mail server" (in the appropriate syntax of PML) as receiving mail (SMTP, which is TCP on port 25) from any machine on the Internet, and defines the "vulnerable mail server" as receiving SMTP only from machines which have been assigned the capability of "hardened mail server". Thus, the "vulnerable mail server" is not accessible to the public network.

PML language constructs also allow for expressing routing policies and encryption policies as the policies relate to defined services and host groups, and to server policies for dns, mail, and other services. A PML program defining the corporate network policy is simply a text (ASCII) file that can be stored on the analysis platform.

Figure 7:
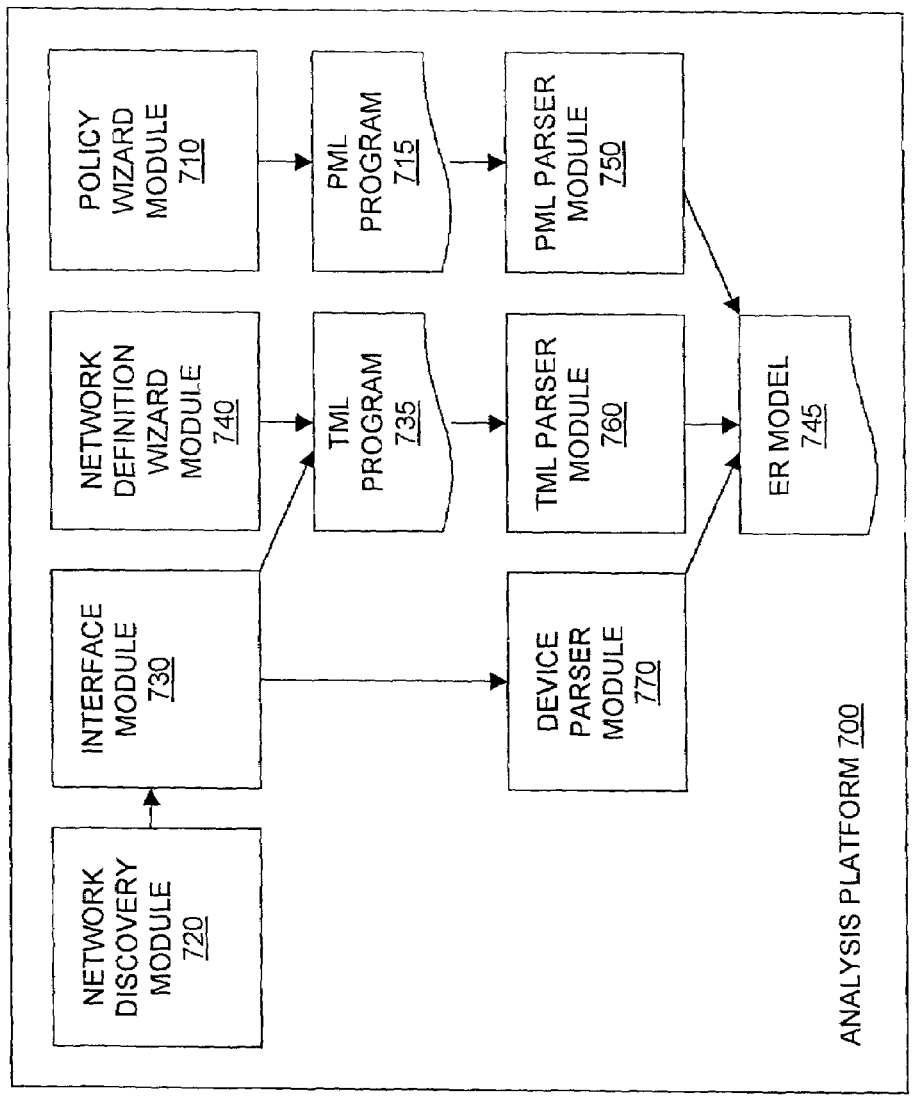
FIG. 7 is a block diagram illustrating a more detailed module structure of an analysis platform in accordance with the present invention.

FIG. 7 is a block diagram illustrating a more detailed module structure of an embodiment of an analysis platform 700. The analysis platform 700 includes a Policy Wizard Module 710, a software tool for allowing the network administrator to define capabilities without actually programming in PML, but rather, by filling out forms and templates (e.g., Web-based forms). The Policy Wizard Module 710 then transforms the information obtained from the network administrator into a PML program 715. The following is a fragment of a PML program, in a possible embodiment of syntax, for defining the capabilities of the two types of mail servers discussed above:

vuln_mail_server_cap <-> hardened_mail_server_cap: (TCP, 25)

hardened_mail_server_cap <-> Internet_cap: (TCP, 25)

In another example, the network administrator wants to set a policy such that the internal routers, using either the Routing Information Protocol (RIP) or the Open Shortest Path First (OSPF) routing protocol, can only accept route updates from routers that are trusted by the network administrator. The following is an embodiment of the corresponding PML syntax:

internal_router_cap <-trusted_router_cap: (RIP_update, OSPF_update)

In a further example, the network administrator wants to define a policy component for VPN gateways to encrypt and decrypt all traffic with 128-bit key strength between them. The following is an embodiment of the corresponding PML syntax:

vpn_gtw_cap <-> vpn_gtw_cap: enc_128 k

Information regarding the basic interconnection of gateways and sub-networks in a network, along with the corresponding IP-address ranges of the gateways and sub-networks, can be obtained using commercially available network discovery tools. For example, HP Openview's Network Node Manager collects this data and displays it as a network map.

The analysis platform 700 further includes a Network Discovery Module 720 for collecting network topology information. In one embodiment, the Network Discovery Module 720 may incorporate one of the commercially available network discovery tools (e.g., HP Openview's Network Node Manager). The Network Discovery Module 720 employs an Interface Module 730 (e.g., an HP Openview interface if the HP Openview tool is used) for extracting the collected information underlying the displayed network map and for translating the information into a TML program 735. The TML program 735 uses a scripting language, such as a Topology Modeling Language (TML), to define the topology of the network. The network administrator can then add to this basic TML program 735 by defining additional host groups, with their associated IP ranges or set of IP addresses. The network administrator can further add to the TML program 735 by defining the IP addresses corresponding to network devices to be analyzed (e.g., firewalls, routers, etc). More importantly, the network administrator can attach capabilities, which are defined in the corresponding PML program 715, to the host groups. Analogous to the PML program 715, the resulting TML program 735 is a simple text (ASCII) file, which can be stored on the analysis platform 700.

The analysis platform 700 further includes a Network Definition Wizard Module 740, a software tool for allowing the network administrator to define host groups and network devices in the network, and to attach capabilities to the host groups and network devices without actually programming in TML, but rather, by filling out forms and templates (e.g., Web-based forms). The Network Definition Wizard Module 740 then transforms the obtained information into a TML program. The Network Definition Wizard Module 740 can also allow the network administrator to edit an existing TML program, such as the TML program 735 created by the Interface Module 730. The following is a fragment of the TML program 735, in a possible embodiment of syntax, for defining a Cisco IOS router with the name "internal_router_nyc" as having two interfaces (if1, if2), along with the respective IP addresses. A sub-network "dmz" is connected to the rest of the network by two routers, one of which is the router "internal_router_nyc" at its "if1" interface. A host "mail_server" is on the "dmz" sub-network since the IP address of the host falls within the IP address range of the "dmz" sub-network.

```
GATEWAYS {
  internal_router_nyc = {if1: {IP=111.222.1.1,
          if2: {IP=111.222.2.1}
          MAKE cisco_ios WITH internal_router_cap
}
SUB-NET {
  dmz    = [111.222.1.0/24]: {if1, if3} WITH server_cap
}
HOST {
  mail_server = [111.222.1.17] WITH hardened_mail_server_cap
}
```

The network administrator can attach the capability "internal_router_cap" to the router "internal_router_nyc." The network policy and the network topology can thus be joined on the analysis platform 700. The TML program 735 further defines a sub-network "dmz" connected, at one end, to an external router and a host with the name "mail_server" in the sub-network "dmz." The host has been assigned the capability "hardened_mail_server_cap."

Each network device has a configuration file associated therewith. The network administrator typically reads from and writes to a configuration file of a network device by opening, for example, a secure (password protected) telnet session (from his/her desktop) to the network device. The network administrator can manually place all configuration files of the relevant network devices (as defined in the TML program above) in a pre-defined directory on the analysis platform 700 and add the corresponding path and access information to the TML program 735. Alternatively, the network administrator can add, in the TML program 735, a remote location and password for each configuration file to allow the analysis platform 700 to access the configuration file of a network device or a host and to collect the configuration files automatically. Following is a fragment of the TML program 735 provided above, which has been extended to include the location of the configuration file of the interface if1 of the router "internal_router_nyc":

```
GATEWAYS {
  internal_router_nyc =
    {if1: {IP=111.222.1.1, FILE="/Ontura/conf_files/rules_if1"}
  }
```

The analysis platform 700 further includes a plurality of software modules for building an internal ER model 745, using the TML program 735 and the PML program 715 as inputs. The ER model 745 is typically a data structure stored in main memory while the analysis platform 700 is performing its analysis of the network. FIGS. 5 and 6 illustrate portions of an embodiment of an ER model. From this description, a programmer can easily build actual data structures in high-level programming languages, such as C or Java, using arrays and dynamic pointers (for dynamic storage allocation).

A PML Parser Module 750 is built using standard compiler technology to parse each capability definition of the PML program 715 and to create an instance of the ER model 745 for the capability in the main memory of the analysis platform 700. For example, the software tools "lex" (or "flex") and "yacc" (or "bison"), which are freely available in the UNIX operating system environment under the GNU license, can be used to implement the PML Parser Module 750. It is standard practice to program these tools with the syntax of the language under consideration (in this case, PML) and the preferred output structure (in this case, the ER model) to thereby obtain a module (the PML Parser Module 750) for transforming the PML program 715 into the ER model 745.

A TML Parser Module 760 is built using standard compiler technology to parse each statement in the TML program 735 and to create an instance of the ER model 745 representing the sub-network, host group, or network device defined by the statement, together with its connectivity. A possible way to implement the TML Parser Module 760 is with the lex and yacc software tools. Each time the TML Parser Module 760 encounters, in a TML statement, a network device which needs to be analyzed, the TML Parser Module 760 calls an appropriate Device Parser Module 770 for the particular network device. The TML Parser Module 760 also passes to the Device Parser Module 770 the device type (e.g., router) and make (e.g., Cisco IOS version x.y).

The Device Parser Module 770 is a software module for creating a configuration model for the network device. The Device Parser Module 770 obtains the configuration file of the network device (e.g., from the TML program) and parses the configuration file using standard compiler technology (e.g., tools such as lex and yacc). The Device Parser Module 770 is capable of parsing the syntax of the different types of configuration files associated with the network devices. The configuration model is preferably different for each type of network device (e.g., firewall, router), but is preferably the same for a particular type of network device independent of vendor. That is, the configuration model for a network device, such as a firewall, captures all the salient configuration features of a firewall (e.g., rules to determine if an IP packet is passed or dropped) by abstracting from the vendor specific expression of these rules.

The configuration model is part of the ER model 745 and describes the actual configuration of a particular network device. For example, if the network device is a firewall, the configuration model captures the filtering rules, such that the analysis platform 700 can simulate the behavior of the firewall when receiving a given IP packet. The description is general, yet detailed enough to capture the different kinds of firewalls (i.e., the "lowest common denominator").

For example, access control lists (ACLs) in Cisco routers filter IP traffic without keeping any internal state (i.e., are "stateless"). Consequently, a configuration file for allowing an incoming telnet session should specify the incoming TCP initiation packets and the outgoing reply packets. In a firewall with "stateful" inspection (e.g., a Checkpoint firewall), the configuration file only needs to allow incoming telnet traffic because the internal state automatically remembers to pass the outgoing reply packets.

The configuration model thus needs to capture the lowest level of configuration granularity (e.g., the level of ACL or lower, in the case of firewalls). Therefore, when parsing a configuration file for a Checkpoint firewall, the Device Parser Module 770 needs to generate, for each "stateful" rule, at least two rules in the configuration model, describing the allowed traffic in each direction. Similarly, for routers, VPNs, gateways, etc., the Device Parser Module generates a configuration model that expresses the device configuration data at the lowest level of abstraction.

Figure 8:
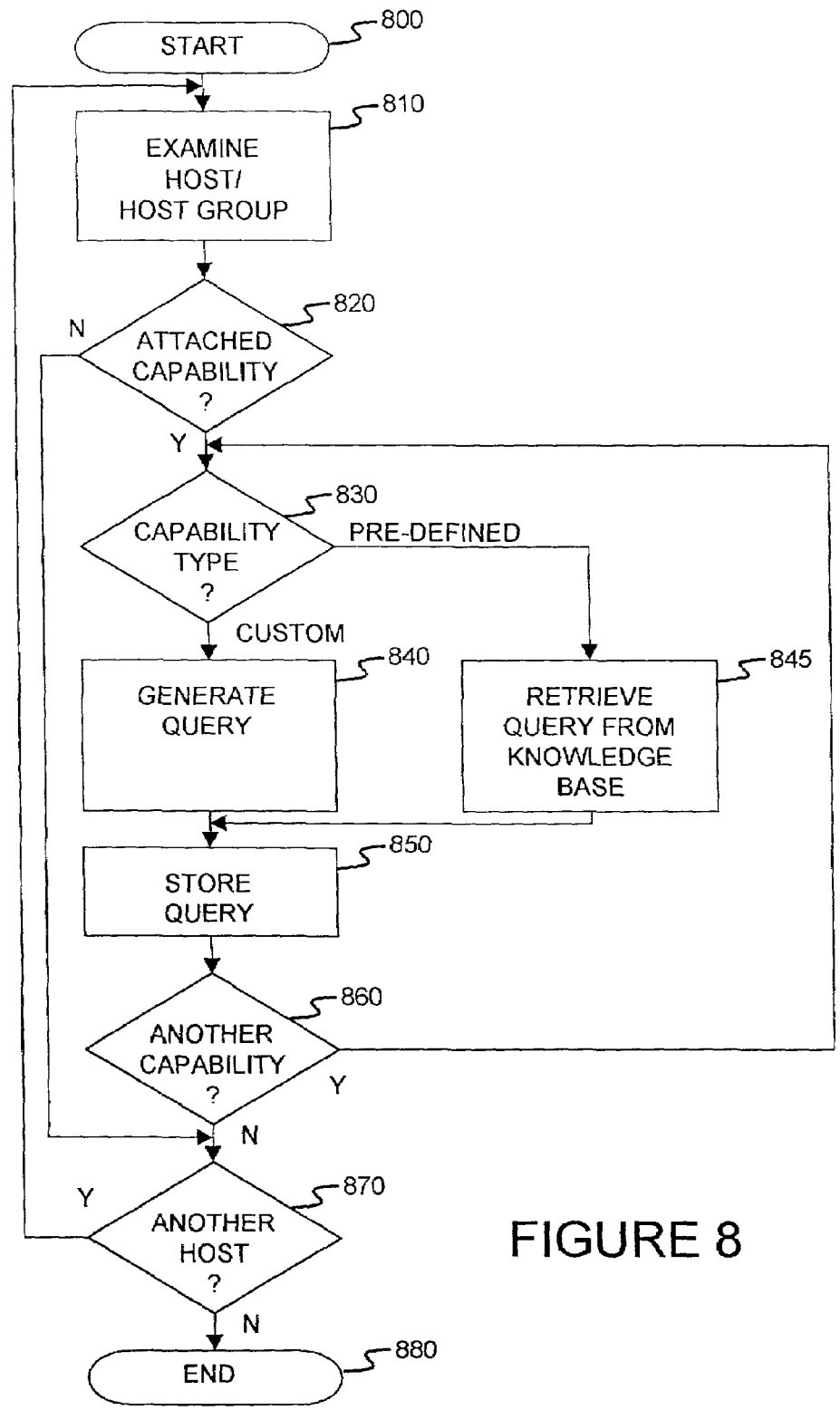
FIG. 8 is a flow diagram illustrating the operation of a query generator in accordance with the present invention.

FIG. 8 is a flow diagram illustrating the operation of a query generator in accordance with the present invention. The process starts at step 800. In step 810, the query generator traverses (in a memory of the analysis platform) the data structure representing the ER model for the network under consideration. For each host or host-group, the query generator determines if it has an attached capability (step 820). If there is an attached capability, the query generator then determines the type of capability (custom or pre-defined) in step 830.

For each attached capability, the query generator generates the appropriate queries. For IP capabilities, for example, typically traffic flow queries are generated. A traffic flow query asks what IP-based services can move trough the network under consideration, either from or to (or both) the fixed host-groups or hosts (source and destination, respectively), and can also include sub-queries about the routes of the traffic under consideration.

If the capability is a custom-defined capability (Custom in step 830), such as a simple custom-defined IP capability (no routing or security info is included in the service), the queries can be generated in a rather straightforward way (in step 840). One or more traffic flow queries are generated, which have the current host-group as destination and represent all the possible sources. For example, if a host H has the capability "trusted_mail_server_cap" as defined earlier, then the query generator can add the following query: "what IP traffic, from any source, can reach host H as its destination?"

If the capability is a pre-defined capability (Pre-defined in step 830), the queries can be retrieved from a knowledge base (in step 845). For simple pre-defined IP capabilities (e.g., "dns_server"), the query generator accesses the knowledge base to retrieve the required queries.

For host capabilities, server behavior queries are generated. The nature of the queries is dependent on the capability itself. For example, a "dns-info" capability may specify whether the server is a "primary server", "secondary server", or just a "resolver" and may also specify how the server should initialize its cache. Queries directed at the dns configuration model can be generated to verify the capability. The queries are then stored in step 850. As one exemplary solution, the queries are stored in main memory, possibly in an array data structure.

Then, in step 860, the query generator determines if the host or host group has another attached capability. If so (Yes in step 860), the process returns to step 830 to determine the capability type. Otherwise (No in step 860), the process continues to step 870 wherein the query generator determines if there is another host or host group in the network to be analyzed. If there is another host or host group (Yes in step 870), the process returns to step 810 wherein the host or host group is examined. Otherwise (No in step 870), the process ends at step 880.

The knowledge base contains the expert knowledge of the analysis platform, including security knowledge, network administration knowledge, etc. For example, the knowledge base may include queries that need to be asked to ensure that the security delivered by all the filtering devices present is adequate for the pre-defined capabilities, such as "mail-server", "dns-server", etc. For example, the knowledge base understands that "dns-server" is a sensitive capability and that no unauthorized host should be able to telnet to a host with the dns-server capability. The knowledge base contains information for each pre-defined capability. The internal structure of the knowledge base may be simple file-based name-value pairs or a small database. The knowledge base has an interface that allows updates to be made by the staff of the analysis platform as part of upgrades to the analysis platform. Additionally, the knowledge base can be updated by a network administrator who wishes to encode some of his/her expert knowledge into the knowledge base.

Figure 9:
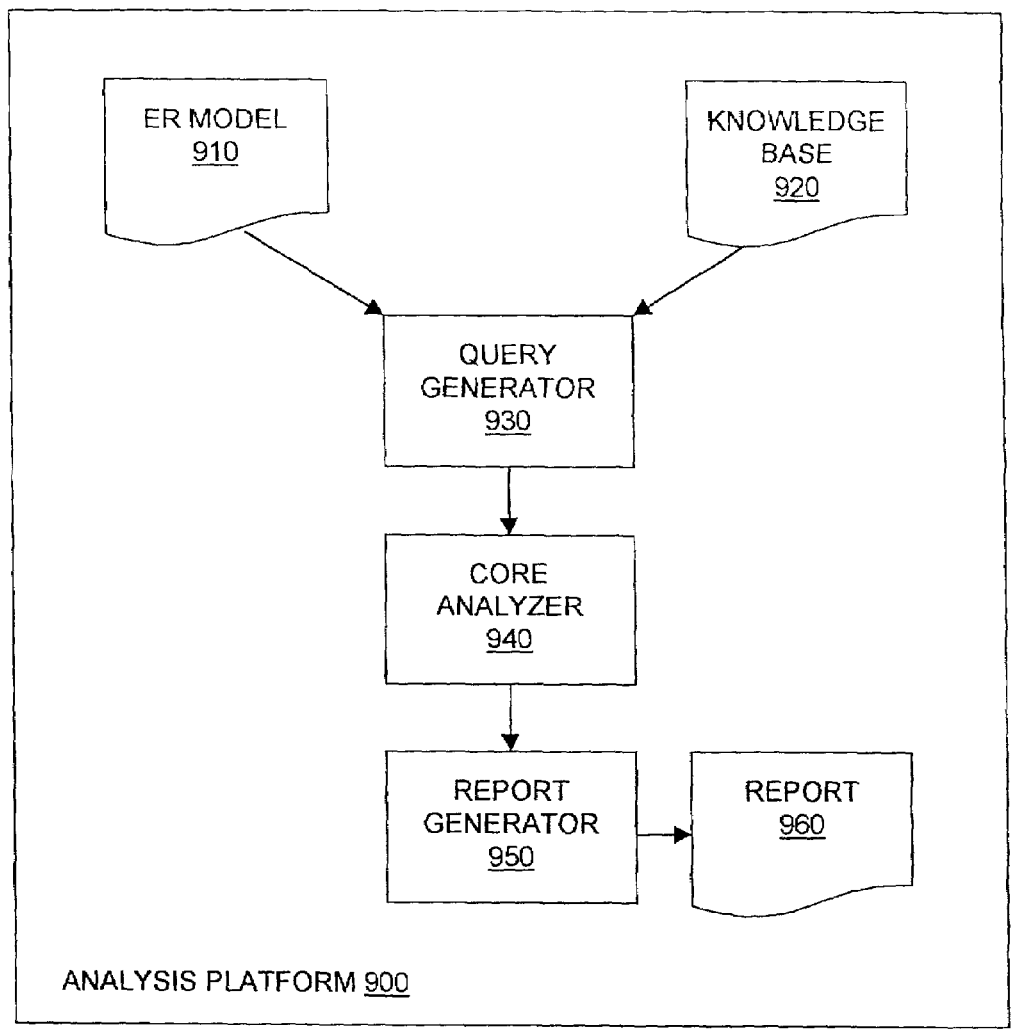
FIG. 9 is a block diagram illustrating a portion of a module structure of an embodiment of an analysis platform.

FIG. 9 is a block diagram illustrating a portion of a module structure of an embodiment of an analysis platform 900. The analysis platform 900 includes a Query Generator 930 that generates the appropriate queries for analyzing a network based on an ER Model 910 of the network and a Knowledge Base 920, which contains the security expert knowledge of the analysis platform 900.

The analysis platform 900 further includes a Core Analyzer 940 that traverses the main memory data structure containing all the queries. For each query, the Core Analyzer 940 executes the following: If the query is a traffic flow query, then the Core Analyzer 940 executes a flow analysis algorithm on a graph, derived from the connectivity information in the ER Model 910. The Core Analyzer 940 starts with the source of the flow and computes all the paths the flow can follow to reach the destination. Each node in this graph is a gateway and each edge is a sub-network connecting the two gateways. The Core Analyzer 940 consults the configuration model for the gateway device (which is part of the overall ER model) and uses the configuration model to simulate the gateway's behavior (under its current configuration) and thereby obtains the gateway's actions, such as filtering, encrypting/decrypting or forwarding/routing to another sub-network. The Core Analyzer 940 also consults the configuration of the source and/or destination to understand whether these hosts influence the traffic flow. The Core Analyzer 940 writes the resulting flows to a file, where all the query's answers are accumulated. For example, the query "what IP traffic, with any source can reach host H as its destination?" from above causes the Core Analyzer 940 to execute a traffic flow analysis that returns all the IP traffic which can reach host H as destination, given the current configuration of all the gateway and hosts in the network under consideration.

If the query is a server behavior query (e.g., DNS server configuration), then the Core Analyzer 940 retrieves the corresponding values of the configuration model of the host under consideration. The values are then interpreted to simulate the resulting behavior, which is presented in the answer file.

Finally the Core Analyzer 940 scans through the answers generated in response to an analyzed capability to determine whether the collection of answers indicates any unwanted traffic or functionality or, at the other extreme, whether there are any missing traffic or functionality (in other words, a policy violation). If so, the Report Generator 950 is invoked. The Core Analyzer 940 passes the corresponding capability and the answer causing the violation. For traffic flow queries and answers, the Core Analyzer 940 might also pass the gateway, which causes the violation. For example, the answer to the above query regarding host H may reveal that telnet traffic from any host in some corporate sub-network is able to reach host H. This traffic is not part of the traffic specified by the attached capabilities for host H. The Core Analyzer 940 consequently invokes the Report Generator 950 and passes to the Report Generator 950 information regarding host H, the telnet traffic and its sources, and possibly the gateway or host configuration that passes the telnet traffic instead of filtering it out.

In another example, a server might have a host capability for DNS, which indicates it should be a primary server. The executed query might reveal that the actual configuration makes the server a secondary DNS server. Again, the Core Analyzer 940 invokes the Report Generator 950, with the information regarding the host, including the part of the host configuration that causes the server not to fulfill the desired capability.

The Report Generator 950 creates a formatted file (Report 960) with an entry for each time that it was invoked by the Core Analyzer 940. The Report Generator 950 can format the file in HTML for easy viewing with a browser or can e-mail the file as ASCII text to the network administrator. An example of an entry, generated for the policy violation concerning the trusted mail server host H (see above) might look as follows. The entry includes specifications about which part of the policy (e.g., which capability) is not being enforced, the host(s) that are affected, how the violation manifests itself, and which device needs to re-configured to remove the violation. The Report Generator 950 obtains all the necessary information from the Core Analyzer 940 each time it is invoked to generate another entry. The entry below (e.g., the 5th in the Report 960) indicates that the router "internal_router nyc" needs to filter telnet traffic from the corporate sub-net to the mail server.

POLICY VIOLATION ENTRY #5:
CAPABILITY: trusted_mail_server_cap
HOST: mail_server [111.222.1.17]
VIOLATION: telnet FROM corp_net
CONFIGURATION: internal_router_nyc Alternatively, graphical representations may also be incorporated as part of the Report 960. The Report 960 may include a map of the network under consideration, highlighting the hosts that are affected by policy violations in one particular fashion and highlighting network devices whose configurations cause the violations in a different fashion.

Up to this point, the analysis platform has been used to define a network policy, to collect all the necessary data (configuration files, network topology, etc.) regarding a network, and to obtain reports indicating violations of the configuration of the network against the network policy. A network administrator can establish the network policy and use the report generated to correct the initial problems with the configuration files. The analysis platform can also be used in another mode of operation. After the initial configuration of the network devices has been performed, the network administrator and his/her team will likely have to make changes to the configuration files of the network devices to accommodate changes within the company, such as new business relationships, new internal corporate structures, etc.

Figure 10:
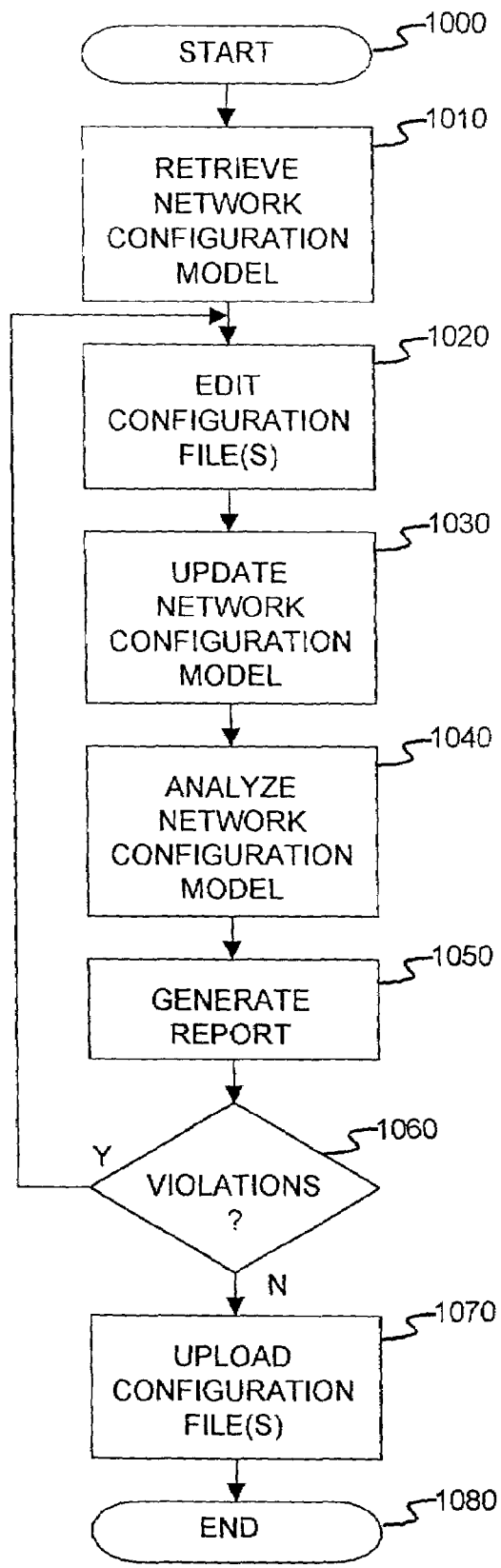
FIG. 10 is a flow diagram illustrating an operation of the analysis platform in analyzing changes to the configuration files of the network devices.

FIG. 10 is a flow diagram illustrating an operation of the analysis platform in analyzing changes to the configuration files of the network devices. The process begins at step 1000. Since the Network Configuration Model already exists on the analysis platform, at step 1010, the Network Configuration Model is retrieved. The network administrator can edit one or more configuration files with his/her proposed changes and upload the new configuration file(s) to the analysis platform in step 1020. In step 1030, the analysis platform updates the Network Configuration Model in response to the new configuration file(s).

Then, in step 1040, the analysis platform analyzes the changed Network Configuration Model against the network policy and, in step 1050, generates a report indicating the violation(s) against the network policy (if any) caused by the changes to the configuration files. For example, an error in a configuration update for a firewall device can cause all employees at a given corporate site to lose access to the Internet. Without the use of the analysis platform, the administrator would only detect such an error after receiving phone calls from these employees. With the analysis platform, the network administrator can submit configuration changes to the analysis platform to see the effects of the changes, before actually committing these changes to the network device(s), thereby avoiding the above situation.

If there are violations of the network policy (Yes in step 1060), the process returns to step 1020 to allow the network administrator to correct the configuration file(s) that are in error. If there are no violations, the process can continue to an optional step 1070 wherein the analysis platform functions as a telnet pass-through to allow change(s) to the configuration file(s) to be uploaded to the corresponding network device(s). Instead of telnetting directly into a network device, the network administrator can telnet into the analysis platform and upload the changed configuration file (step 1020). The analysis platform then updates the ER model accordingly (step 1030), runs the analyzer (step 1040), and if there are no new violations against the existing policy (No in step 1060), a distributor module on the analysis platform transfers the updated configuration file to the corresponding network device in the network (step 1070), and the process ends at step 1080.

Changes in business relationships and corporate structures may necessitate a change in the network policy. For example, a new external business partner might need direct access from its site to some of the company's sub-networks. In this case, the network administrator needs to change the network policy in addition to changing the configuration files of some devices. Similarly to the previous variation, the network administrator can submit changes to the network policy (either by using a Policy Wizard Module, or by directly changing the PML and/or TML programs stored on the analysis platform) and corresponding changes to configuration files (of the network devices) for the existing Network Configuration Model on the analysis platform. The analysis platform then restarts the analysis, using the changed network policy and configuration files. The analysis platform can then generate a report as before. This report now pinpoints the configurations of those network devices (either freshly submitted or original) that need to be changed in order for the network to adhere to the changed network policy. As discussed in the previous section, the information provided by the report greatly improves the speed and quality of implementing the required changes in the network configuration to support evolving business and corporate functions.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A method, using an analysis platform, for analyzing a network having a plurality of network devices, the method comprising the steps of:

receiving a network policy pertaining to said network, wherein the network policy includes a set of required IP traffic associated with at least a first application on a first host application server;

receiving a topology of said network devices in said network;

receiving configuration data from at least a portion of said network devices;

creating a network configuration model for said network based on said topology and said configuration data received; and analyzing a software simulation of the network in response to said network configuration model and said network policy to determine an existence of a violation of said network policy, wherein the software simulation of the network determines a set of simulated IP traffic for all traversable paths in the network configuration model, wherein analyzing the software simulation of said network comprises:

determining whether a set of simulated IP traffic to the first application on the first host application server in the network configuration model from the set of simulated IP traffic for all the traversable paths is identical to the set of required IP traffic associated with the first application on the first host application server; and determining the existence of the violation of said network policy when the set of simulated IP traffic to the first application on the first host application server in the network configuration model is not identical to the set of required IP traffic associated with the first application on the first host application server.

2. A method in accordance with claim 1, wherein when said violation exists, said method further comprising: generating a report specifying said violation, wherein the violation indicates a potential security risk in the network configuration model.

3. A method of claim 2 wherein analyzing the software simulation also comprises:
determining whether the set of simulated IP traffic to the first application on the first host application server in the network configuration model includes less than all of the set of required IP traffic; and
determining the existence of the violation of said network policy when the set of simulated IP traffic to the first application on the first host application server in the network configuration model includes less than all of the set of required IP traffic.

4. A method of claim 3 wherein the violation indicates a problem with the network configuration model with respect to the first application on the first host application server.

5. A method in accordance with claim 1, wherein said network configuration model comprises an entity-relationship model.

6. A method in accordance with claim 5, wherein said network policy comprises IP capabilities and host application capabilities, said entity-relationship model employing said capabilities.

7. A method in accordance with claim 6, wherein said step of analyzing comprises the step of generating a query pertaining to one of said capabilities.

8. A method in accordance with claim 6, wherein said step of analyzing comprises the step of retrieving a query from a knowledge base associated with said analysis platform.

9. A method in accordance with claim 1, wherein said step of analyzing comprises the step of simulating at least a portion of said network devices in said network.

10. A method in accordance with claim 1, wherein said step of analyzing comprises the step of performing the software simulation of the network to determine the set of simulated IP traffic for all the traversable paths.

11. A method in accordance with claim 1, wherein said step of receiving said configuration data comprises the step of receiving configuration data from a subset of said network devices in said network.

12. A method in accordance with claim 11, wherein the subset of the network devices is determined by said network policy.

13. A method in accordance with claim 11, wherein the subset of the network devices is determined by said topology.

14. A method in accordance with claim 1 wherein analyzing the software simulation further comprises:
determining whether the set of simulated IP traffic to the first application on the first host application server in the network configuration model is limited to a type of traffic, wherein said network policy defines said host as being limited to said type of traffic.

15. A method in accordance with claim 1, wherein said first host application server is selected from the group consisting of:
a mail server;
a domain name server;
an access control server; and
a web server.

16. A method in accordance with claim 14,
wherein a second network device is coupled to said first application on the first host application server in the network configuration model for routing traffic thereto, and wherein said step of analyzing the software simulation further comprising the step of analyzing said second network device-to ensure that appropriate IP traffic is routed to said first application on the first host application server.

17. A method in accordance with claim 16, wherein said second network device is selected from the group consisting of:
a router;
a network switch; and
a VPN device and a firewall.

18. A method in accordance with claim 1,
wherein said network policy describes an IP traffic routing sequence, and
wherein said step of analyzing comprising the step of determining that routes taken by IP traffic in said network corresponds to said IP traffic routing sequence.

19. A method in accordance wit claim 1,
wherein one of said plurality of network devices comprises a host, and
wherein said step of analyzing comprising the step of verifying that a configuration of said host corresponds to said network policy.

20. A method of claim 1,
wherein the network policy describing the set of required IP traffic associated with the first application on the first host application server comprises requirements of the first application operating on the first host application server, and
wherein the requirements comprise network traffic to a second host application server.

21. A method of claim 20, further comprising generating a report indicating a set of simulated inbound IP traffic directed to the first application on the first host application server, and a set of simulated outbound IP traffic output from the first application on the first host application server.

22. In a network having a plurality of network devices, a method, using an analysis platform for analyzing a proposed change to a configuration file of one of said network devices, the method comprising the steps of:
receiving a network policy pertaining to said network, wherein the network policy comprises a set of required IP traffic appropriate for a first application on a first host application server;
receiving a network configuration model for said network, wherein said network configuration model is based on a topology of said network and configuration data pertaining to at least a portion of said network devices;
receiving said proposed change to said configuration file;
creating an updated network configuration model based on said proposed change; and
analyzing a software simulation of the network in response to said updated network configuration model in accordance with said network policy to determine the existence of a violation of said network policy, wherein the software simulation of the network determines a set of simulated IP traffic for all traversable paths in the updated network configuration model, wherein analyzing the software simulation comprises:
determining a set of simulated IP traffic to the first application on the first host application server from the set of simulated IP traffic for all traversable paths;
determining whether the set of simulated IP traffic to the first application on the first host application server in the updated network configuration model is identical to the set of required IP traffic; and determining the existence of the violation of said network policy when the set of simulated IP traffic to the first application on the first host application server in the updated network configuration model is not identical to the set of required IP traffic.

23. A method in accordance with claim 22, wherein when said violation exists, said method farther comprising: generating a report specifying said violation, wherein the violation indicates a problem with the proposed change to the network configuration model with respect to the first application on the first host application server.

24. A method of claim 23 wherein analyzing the software simulation also comprises:
   determining whether the set of simulated IP traffic to the first application on the first host application server in the updated network configuration model exceeds the set of required IP traffic; and
   determining the existence of the violation of said network policy when the set of simulated IP traffic to the first application on the first host application server in the updated network configuration model is less than all of or exceeds the set of required IP traffic.

25. A method of claim 24 wherein the violation indicates a potential security risk with the proposed change to the network configuration model with respect to the first application on the first host application server.

26. A method of claim 25, further comprising generating a report indicating a set of simulated inbound IP traffic directed to the first application on the first host application server, and a set of simulated outbound IP traffic output from the first application on the first host application server.

27. A method of claim 26, wherein the network policy describing the set of required IP traffic associated with the first application on the first host application server comprises requirements of a host application operating on the first application on the first host application server, wherein the requirements comprise network traffic to a second host application server.

28. A method in accordance with claim 22, wherein said step of analyzing comprises the step of retrieving a query from a knowledge base associated with said analysis platform.

29. A method in accordance with claim 22, wherein said step of analyzing comprises the step of simulating at least a portion of said network devices in said network.

30. A method in accordance with claim 22, wherein said step of analyzing comprises the step of determining predicted IP traffic flow through said network.

31. A method in accordance wit claim 22, further comprising the step of uploading a configuration file containing said proposed change to said network device if no violation exists.

32. A method in accordance with claim 22, wherein said step of receiving said network configuration model comprises the step of retrieving said network configuration model from a storage device associated with said analysis platform.

33. A method, using an analysis platform, for analyzing a software simulation of the network in response to a proposed change to a network policy pertaining to a network, the method comprising the steps of:
   receiving a network configuration model for said network, wherein said network configuration model is based on a topology of said network and configuration data pertaining to at least a portion of network devices in said network;
   receiving said proposed change;
   analyzing a software simulation of the network in response to a new network policy that incorporates said proposed change to determine the existence of a violation of said new network policy, wherein the software simulation of the network determines a set of simulated IP traffic for all traversable paths in the network configuration model;
   wherein the network policy comprises a set of required IP traffic appropriate for a first application host, and
   wherein analyzing the software simulation of the network comprises:
      determining a set of simulated IP traffic to the first application on the first host application server in response to the set of simulated IP traffic for all traversable pats;
      determining whether the set of simulated IP traffic to the first application on the first host application server in the network configuration model is identical to the set of required IP traffic; and
      determining the existence of a problem with the new network policy when the set of simulated IP traffic to the first application on the first host application server in the network configuration model is not identical to the set of required IP traffic.

34. A method in accordance with claim 33, wherein said step of analyzing comprises the step of retrieving a query from a knowledge base associated with said analysis platform.

35. A method in accordance with claim 33, wherein said step of analyzing comprises the step of performing a software simulation of the network in response to the network configuration file.

36. A method in accordance with claim 33, wherein said step of analyzing comprises the step of determining IP traffic flow through said network.

37. A method in accordance with claim 33, wherein said step of receiving said network configuration model comprises the step of retrieving said network configuration model from a storage device associated with said analysis platform.

38. A method of claim 33, wherein when said problem exists, said method further comprises generating a report specifying said problem, wherein the problem indicates a problem with the new network policy with respect to the first application on the first host application server.

39. A method of claim 38 wherein analyzing the software simulation also comprises:
   determining whether the set of simulated IP traffic to the first application on the first host application server in the network configuration model exceeds the set of required IP traffic; and
   determining the existence of the problem with the new network policy when the set of simulated IP traffic to the first application on the first host application server in the network configuration model is less than all of or exceeds the set of required IP traffic.

40. A method of claim 39 wherein the problem indicates a potential security risk with the new network policy with respect to the first application on the first host application server.

41. A method of claim 40, further comprising generating a report indicating a set of simulated inbound IP traffic directed to the first application on the first host application server, and a set of simulated outbound IP traffic output from the first application on the first host application server.

42. A method of claim 41, wherein the network policy describing the set of required IP traffic associated with the first application on the first host application server comprises requirements of the first application operating on the first host application server, wherein the requirements comprise network traffic to a second host application server.

43. A computer program stored on a computer readable medium, performed by a computer, for analyzing a network having a plurality of network devices, the computer program comprising:
- instructions for parsing a network policy file containing a network policy pertaining to said network, wherein the network policy describes a set of required IP traffic associated with a first application on the first host application server;
- instructions for parsing a network topology file containing a topology of said network devices in said network, wherein said network devices have associated configuration files;
- instructions for parsing associated configuration files of at least a subset of said network devices to obtain configuration data instructions for determining a network configuration model in response to said topology and said configuration data, wherein the network configuration model also comprises a set of simulated IP traffic associated with the first application associated with the first application server from a set of simulated IP traffic for all traversable paths in the network configuration model, wherein a software simulation of the network determines the set of simulated IP traffic for all traversable paths in the network configuration model;
- instructions for receiving a query for analyzing the set of simulated IP traffic associated wit the first application server, and
- instructions for using said query to determine the existence of a problem in response to the query comprising instructions for comparing the set of simulated IP traffic associated with the first application on the first host application server to the set of required IP traffic associated with the first application on the first host application server.

44. A computer program in accordance with claim 43, further comprising instructions for allowing a user to define said network devices in said network without using a programming language.

45. A computer program in accordance with claim 43, further comprising instructions for collecting said topology of said network devices and creating a network topology file therefrom.

46. A computer program in accordance with claim 43, wherein a configuration file of one of said network devices is changed to a new configuration file, said computer program further comprising:
- instructions for creating a new network configuration model based on said new configuration file;
- instructions for generating a new query for analyzing said new network configuration model; and
- instructions for using said new query to determine the existence of a violation of said network policy.

47. A computer program in accordance with claim 43, wherein said network policy is changed to a new network policy, said computer program further comprising:
- instructions for generating a new query for analyzing said network configuration model in accordance with said new network policy; and
- instructions for using said new query to determine the existence of a violation of said new network policy.

48. A computer program of claim 43, wherein the query comprises a change to the network policy;
- wherein instructions for comparing the set of simulated IP traffic associated with the first application on the first host application server to the set of required IP traffic associated with the first application on the first host application server comprises:
  - instructions for determining whether the set of simulated IP traffic to the first application on the first host application server in the network configuration model is limited to the set of required IP traffic; and
  - instructions for determining a problem wit the change to the network policy when the set of simulated IP traffic to the first application on the first host application server in the network configuration model Is not limited to the set of required IP traffic.

49. A computer program of claim 48 wherein the problem indicates a potential security risk with the change to the network policy.

50. A computer program of claim 43, wherein the query comprises a change to the network policy;
- wherein instructions for comparing the set of simulated IP traffic associated with the first application on the first host application server to the set of required IP traffic associated with the first application on the first host application server comprises:
  - instructions for determining whether the set of simulated IP traffic to the first application on the first host application server in the network configuration model includes less than all of the set of required IP traffic; and
  - instructions determining a problem with the change to the network policy when the set of simulated IP traffic to the first application on the first host application server in the network configuration model includes less than all of the set of required IP traffic.

51. A computer program of claim 50, wherein the problem indicates a problem with the change to the network policy respect to the first application on the first host application server.

52. A computer program of claim 43
- wherein the query comprises a change to the network configuration model;
- wherein instructions for comparing the set of simulated IP traffic associated with the first application on the first host application server to the set of required IP traffic associated with the first application on the first host application server comprises:
  - instructions for determining whether the set of simulated IP traffic to the first application on the first host application server in the network configuration model is limited to the set of required IP traffic; and
  - instructions for determining a problem with the change to the network configuration model when the set of simulated IP traffic to the first application on the first host application server in the network configuration model is not limited to the set of required IP traffic.

53. A computer program of claim 52 wherein the problem indicates a potential security risk with the change to the network configuration model.

54. A computer program of claim 43,
- wherein the query comprises a change to the network policy;
- wherein instructions for comparing the set of simulated IP traffic associated with the first application on the first host server to the set of required IP traffic associated with the first application on the first host server comprises:
  instructions for determining whether the set of simulated IP traffic to the first application on the first host application server in the network configuration model includes less than all of the set of required IP traffic; and
  instructions determining a problem wit the change to the network configuration model when the set of simulated IP traffic to the first application on the first host server in the network configuration model includes less than all of the set of required IP traffic.

55. A computer program of claim 54, wherein the problem indicates a problem with the change to the network policy respect to the first application on the first host application server.

56. A computer program stored on a computer readable medium for processing data, comprising:
  instructions for receiving a network policy pertaining to a network wherein the network policy describes a set of required IP traffic associated with a first application on a first host server;
  instructions for receiving a topology of a plurality of network devices in said network;
  instructions for receiving configuration data from at least a portion of said plurality of network devices;
  instructions for creating a network configuration model for said network based on said topology and said configuration data received, wherein the network configuration model comprises a set of simulated IP traffic associated with the first host server determined in response to a set of simulated IP traffic for all traversable paths in the topology of the plurality of network devices, wherein the set of simulated IP traffic for all traversable paths in the topology is determined in response to a software simulation of the network;
  instructions for analyzing the set of simulated IP traffic associated with the first application on the first host server in accordance with said network policy to determine the existence of a violation of said network policy comprising:
    instructions for comparing the set of simulated IP traffic associated with the first application on the first host application server in the network configuration model to the required IP traffic associated with the first host server, and
    instructions for generating a report specifying said violation if said violation exists.

57. A computer program in accordance with claim 56, wherein said network configuration model comprises an entity-relationship model.

58. A computer program in accordance with claim 57, wherein said network policy is expressed in terms of capabilities, said entity-relationship model employing said capabilities.

59. A computer program in accordance with claim 58, further comprising instructions for retrieving a query pertaining to one of said capabilities from a knowledge base associated with said computer.

60. A computer program in accordance wit claim 56, further comprising instructions
  for performing the software simulation of the network configuration model to determine the set of simulated IP traffic for all traversable paths in the topology of the plurality of network devices.

61. The computer program of claim 56 wherein for comparing the set of simulated IP traffic associated with the first application on the first host server in the network configuration model to the required IP traffic associated with the first host server comprises:
  instructions for determining whether the set of simulated IP traffic associated the first application on the first host server in the network configuration model exceeds the set of required IP traffic; and
  instructions for determining a the violation when the set of simulated IP traffic to the first application on the first host server is not limited to the set of required IP traffic.

62. The computer program of claim 56 wherein for comparing the set of simulated IP traffic associated with the first application on the first host application server in the network configuration model to the required TIP traffic associated with the first host server comprises:
  instructions for determining whether the set of simulated IP traffic associated the first application on the first host application server in the network configuration model includes less than all of the set of required IP traffic; and
  instructions for determining the violation when the set of simulated IP traffic to the first application on the first host application server in the network configuration model includes less than all of the set of required IP traffic.

* * * * *